(12) United States Patent
Chen

(10) Patent No.: US 12,262,692 B2
(45) Date of Patent: Apr. 1, 2025

(54) INTELLIGENT ELECTRIC PULSE EXPELLING AND ISOLATING PET TRAINING STRUCTURE

(71) Applicant: Dongguan Jiasheng Industry Co. Ltd., Dongguan (CN)

(72) Inventor: Silong Chen, Dongguan (CN)

(73) Assignee: Dongguan Jiasheng Industry Co. Ltd., Dongguan (CN)

( * ) Notice: Subject to any disclaimer, the term of this patent is extended or adjusted under 35 U.S.C. 154(b) by 27 days.

(21) Appl. No.: 18/510,721

(22) Filed: Nov. 16, 2023

(65) Prior Publication Data
US 2024/0341276 A1 Oct. 17, 2024

(30) Foreign Application Priority Data
Apr. 17, 2023 (CN) .......................... 202310407994.8

(51) Int. Cl.
*A01K 15/02* (2006.01)
(52) U.S. Cl.
CPC .................... *A01K 15/021* (2013.01)
(58) Field of Classification Search
CPC ............... A01K 15/02; A01K 15/021
See application file for complete search history.

(56) References Cited

FOREIGN PATENT DOCUMENTS

| CN | 207355219 U | * | 5/2018 | ........... A01K 15/021 |
| CN | 207383251 U | * | 5/2018 | ........... A01K 15/021 |
| CN | 215012567 U | | 12/2021 | |
| CN | 116369236 A | * | 7/2023 | ........... A01K 15/021 |

OTHER PUBLICATIONS

Intelligent electric pulse expelling training pet structure (Year: 2023).*
A conductive metal wire with pet training pad (Year: 2018).*
The pet with the cushion contact yield of pet training mat (Year: 2018).*

* cited by examiner

*Primary Examiner* — Yvonne R Abbott-Lewis

(57) ABSTRACT

The application belongs to the technical field of pet appliances, and particularly relates to an intelligent electric pulse expelling and isolating pet training structure, which includes a carrier, conductive wires and a driving source, and the conductive wires are disposed on the carrier; the driving source is electrically connected with the conductive wires; the conductive wires form an electric pulse capable of driving pets away from the carrier on the carrier after powered by the driving source; the conductive wires are made by a composite conductive material, and the conductive wires may make a non-fracture deformation with the carrier. When the pet training structure needs to be stored and cleaned or deforms due to impact of external force, the conductive wires may realize winding, unwinding, coiling, rolling and other non-fracture deformation with the carrier, which is conductive to improving the market reputation of the product.

10 Claims, 4 Drawing Sheets

INTELLIGENT ELECTRIC PULSE EXPELLING AND ISOLATING PET TRAINING STRUCTURE

CROSS-REFERENCE TO RELATED APPLICATIONS

This application claims priority to Chinese Patent Application No. 202310407994.8, filed on Apr. 17, 2023, which are incorporated herein by reference in their entirety.

TECHNICAL FIELD

The application belongs to the technical field of pet appliances, and particularly relates to an intelligent electric pulse expelling and isolating pet training structure.

BACKGROUND

In order to add fun to life, many people select to breed pets, such as cats and dogs, however, training of pets becomes a difficult problem for many pet-breeding people, for example, some furniture is loved by pets, such as sofas and pillows which are, in a lesser case, occupied by them, while in a worse case, damaged by them, they even bite their owners, so that potential safety hazards exist; therefore, pet training rugs have been developed by people for adjusting bad habits of pets.

For example, in a patent with the application No. of CN202022391450.1 and entitled "A Pet Training Rug", a pet training rug includes a rug body, a main control apparatus, a plurality of first conductive wires and a plurality of second conductive wires, one ends of the first conductive wires and the second conductive wires are electrically connected to a control apparatus, the other ends of the first conductive wires and the second conductive wires form an open circuit, and the first conductive wires and the second conductive wires are disposed on the upper surface of the rug body at intervals; the main control apparatus is configured to detect whether the first conductive wires and the second conductive wires are electrically conducted or not and send electric shock current to the first conductive wires when the first conductive wires and the second conductive wires are electrically conducted. Through the arrangement of the above structure, in use, the pet training rug is arranged in a forbidden area, when a pet steps on the training rug, a pet foot rug simultaneously contacts the first conductive wires and the second conductive wires, and the main control apparatus sends electric shock current when detecting that a circuit is conducted; the pet leaves the pet training rug when stimulated by electric shock, so that a good habit is cultivated for the pet, a user does not need to pay attention to behaviors of the pet continuously, the structure is simple, the use is convenient, and the design is reasonable.

It can be concluded from the above description: for the traditional pet training rug, the conductive wires are laid on the surface of the rug body, the circuit formed by the conductive wires may release electric shock current after conduction to stimulate the pet, thus achieving a warning effect, over time, the pet will have a repelling consciousness to the area where the pet training rug is located, thereby achieving a pet training effect.

In most pet training rugs, a current circuit is formed by fully laying conductive wires on the end face of a rug body along a preset path, however, most of the conductive wires in the relevant art are metal fibers or metal-plated fibers, the metal fibers have relatively good conductivity and mechanical performance, but for the textile processing field of pet rugs and the like, the metal fibers are small in cohesive force and poor in spinning performance, and the pet training rugs containing the metal fibers are arranged in a fixed form due to the metal characteristics and cannot be folded, and thus the storage convenience is greatly reduced; for the metal-plated fibers, a metal layer is laid on the surface of the common fibers for improving the conductive effect, the cost is greatly reduced compared with that of the metal fibers, but the washing resistance is poor, meanwhile, in the process of moving, laying, finishing or being contacted by a pet of the pet training rug, the outer surfaces of the conductive wires are easily stressed, the conductive metal layer is easily damaged, the conductivity will be lost over time, and the service life is short.

In conclusion, the pet training rugs in the market have the problems of incapability of being folded and washed for cleaning, short service life and the like due to lack of applicable conductive wires, and cannot meet the requirements of users gradually, so that improvement is urgently needed.

SUMMARY

An objective of the application is to provide an intelligent electric pulse expelling and isolating pet training structure, for solving the technical problem that a pet training rug in the relevant art has incapability of being folded and washed for cleaning, short service life and the like due to lack of applicable conductive wires, and cannot meet the requirements of users gradually.

In order to achieve the purpose, the intelligent electric pulse expelling and isolating pet training structure provided by the embodiment of the application includes a carrier, conductive wires and a driving source, and the conductive wires are disposed on the carrier; the driving source is electrically connected with the conductive wires; the conductive wires form an electric pulse capable of driving pets away from the carrier on the carrier after powered by the driving source; the conductive wires are made by a composite conductive material, and the conductive wires may make a non-fracture deformation with the carrier.

Optionally, the conductive wires are made of an organic composite conductive fiber.

Optionally, the driving source includes a power module, a display module and a control module, and the power module is configured to provide electric energy; the control module includes an interactive unit and an electronic control unit, the interactive unit is connected with the electronic control unit by signals, the electronic control unit is electrically connected with the conductive wires, after obtaining a signal instruction from the interactive unit, the electronic control unit transmits electric energy of the power module to the conductive wires according to the preset signal instruction; and the display module is connected with the electronic control unit by signals and is configured to display the working condition of the pet training structure in real time.

Optionally, the electronic control unit includes a pulse generator and a conductive column, and the pulse generator is connected with the interactive unit by signals; the conductive column is disposed at the signal output end of the pulse generator and in butting conduction with the conductive wires, and the conductive column is configured to guide pulse signals to move to the conductive wires; the pulse generator is a multi-level electrostatic pulse signal generator, and the pulse generator transmits a preset-level electrostatic pulse signal to the conductive column according to the signal of the interactive unit.

Optionally, the electronic control unit further includes a control circuit board and an accommodating part, the accommodating part is disposed on the carrier, the control circuit board is disposed in the accommodating part, the interactive unit, the power module and the display module are disposed on the accommodating part, the interactive unit is connected with the pulse generator through signals through the control circuit board, the control circuit board is electrically connected with the display module, and the power module supplies power to the display module and the pulse generator through the control circuit board.

Optionally, the control circuit board is a rigid circuit board, the accommodating part is disposed in a hard box body structure, the display module is disposed on the end face of the accommodating part, the display module includes a power display part configured for displaying remaining power of a power supply, a pulse level display part configured for displaying signal strength of current electrostatic pulse and a working condition indicating part configured for feeding back the current working state of the pet training structure; the interactive unit includes a switch button disposed on the accommodating part and an adjusting button configured for adjusting the signal strength of the pulse signal generator.

Optionally, the control circuit board is a flexible circuit board, the accommodating part is disposed in a flexible bag body structure, a flexible display screen is disposed on the end face of the accommodating part, the power display part, the pulse level display part and the working condition indicating part are all integrated in the flexible display screen, the switch button and the adjusting button are flexible touch pads, and the switch button and the adjusting button are both disposed in the accommodating part.

Optionally, the driving source includes a power module and a control module, the power module is configured to provide electric energy; the control module includes an interactive unit and an electronic control unit, the interactive unit is connected with the electronic control unit by signals, the interactive unit is connected with a mobile terminal signal of a user through signals, the electronic control unit is electrically connected with the conductive wires, after obtaining a signal instruction from the interactive unit, the electronic control unit transmits electric energy of the power module to the conductive wires according to the preset signal instruction; and the user sends a signal instruction to the interactive unit through the mobile terminal to start, adjust or close the pet training structure through the electronic control unit.

Optionally, the pulse generator is configured to convert low-voltage alternating current provided by the power supply into a high-voltage electrostatic pulse, and the voltage range of the electrostatic pulse generated by the pulse generator is 3.5 kv to 4.5 kv.

Optionally, the power module is a storage battery or dry battery disposed on the carrier; or the power module is an electrical energy conversion circuit connected to an external power supply apparatus.

One or more of the above technical solutions in the intelligent electric pulse expelling and isolating pet training structure provided by the embodiment of the application have at least one of the following technical effects: since the conductive wires disposed in the carrier are made of a composite conductive material, the conductive wires have high ductility and deformation characteristics while realizing an electrostatic pulse circuit after conduction, compared with a pet training rug in the relevant art which has the technical problems of incapability of being folded and washed for cleaning, short service life and the like due to lack of applicable conductive wires, and cannot meet the requirements of users gradually, when the pet training structure provided by the application needs to be stored and cleaned or deforms due to impact of external force, the conductive wires may realize winding, unwinding, coiling, rolling and other non-fracture deformation with the carrier, the structural deformation cannot interfere with the conductivity of the conductive wires, then the convenience and practicability of the pet training structure are effectively improved, the requirements of users are fully met, and it is conductive to improving the market reputation of the product.

BRIEF DESCRIPTION OF THE DRAWINGS

In order to describe the technical solutions in the embodiments of the application more clearly, the drawings required to be used in description of the embodiments or the relevant art will be simply introduced below, obviously, the drawings described below are only some embodiments of the application, and other drawings can further be obtained by those of ordinary skill in the art according to the drawings without creative work.

DETAILED DESCRIPTION OF THE EMBODIMENTS

Figure 1:
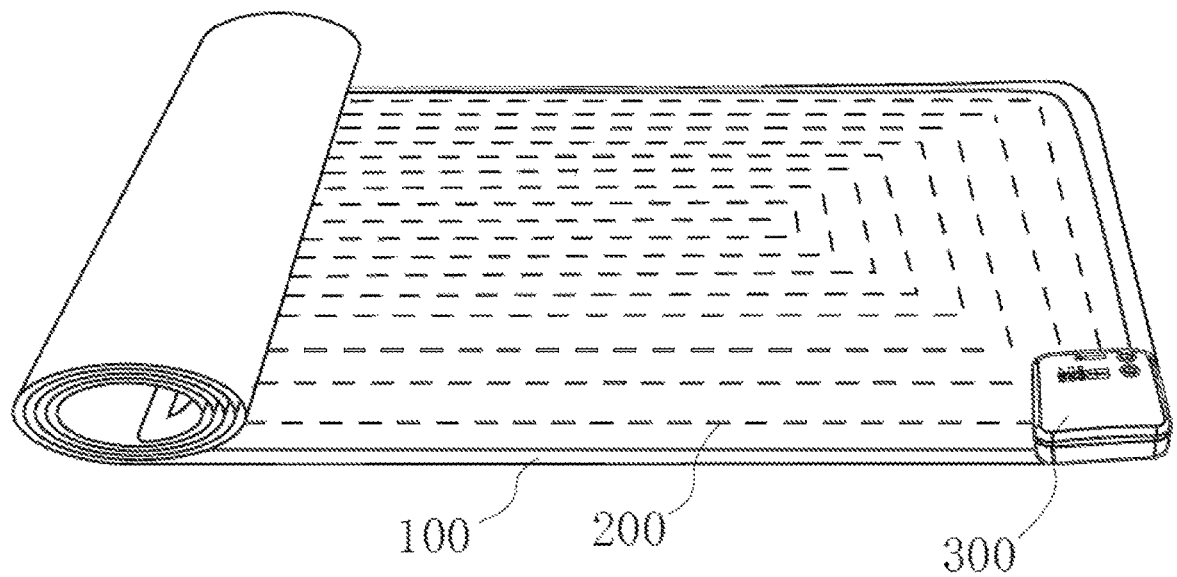
FIG. 1 is a schematic structure diagram of an intelligent electric pulse expelling and isolating pet training structure provided by an embodiment of the application.
Figure 2:
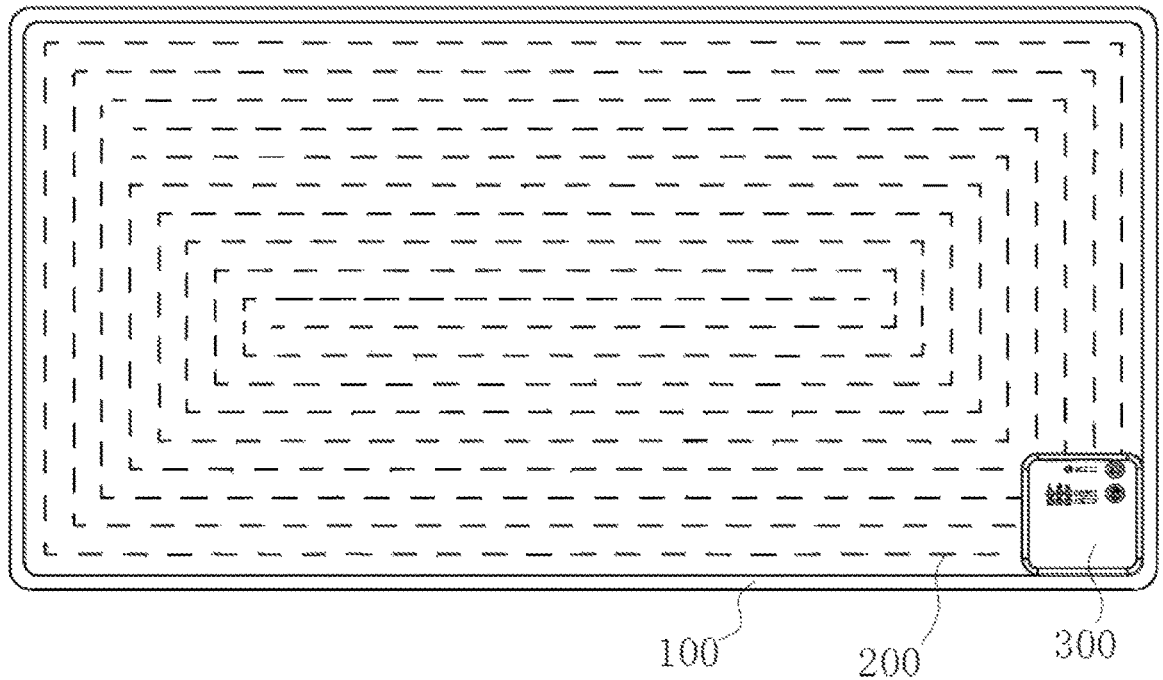
FIG. 2 is a schematic structure diagram of a front view of an intelligent electric pulse expelling and isolating pet training structure in FIG. 1.

The embodiments of the application will be described in detail below, examples of which are illustrated in the drawings, in which like or similar reference numerals refer to the same or similar elements or elements having the same or similar function throughout. The embodiments described below by reference to FIGS. 1-5 are exemplary only for explaining the embodiments of application and are not to be understood as limiting the application.

In the description of the embodiments of application, it is to be understood that orientation or position relationships indicated by terms "length", "width", "upper", "lower", "front", "rear", "left", "right", "vertical", "horizontal", "top", "bottom", "inner", "outer", and the like are orientation or position relationships shown in the drawings, are adopted not to indicate or imply that indicated devices or components must be in specific orientations or structured and operated in specific orientations but only to conveniently and simply describe the application and thus should not be understood as limits to the application.

In addition, terms "first" and "second" are only adopted for description and should not be understood to indicate or imply relative importance or implicitly indicate the number of indicated technical features. Therefore, a feature defined by "first" and "second" may explicitly or implicitly indicate inclusion of at least one such feature. In the description of embodiments of the application, "plurality" means two or more, unless otherwise limited definitely and specifically.

In the embodiments of the application, unless otherwise definitely specified and limited, terms "install", "mutually connect", "connect", "fix" and the like should be broadly understood. For example, the terms may refer to fixed connection and may also refer to detachable connection or integration. The terms may refer to mechanical connection and may also refer to electrical connection. The terms may refer to direct mutual connection, may also refer to indirect connection through a medium and may refer to communication in two components or an interaction relationship of the two components. For those of ordinary skill in the art, specific meanings of the above terms in the embodiments of the application can be understood according to a specific condition.

In one embodiment of the application, as shown in FIGS. 1-5, an intelligent electric pulse expelling and isolating pet training structure is provided, including a carrier 100, conductive wires 200 and a driving source 300, and the conductive wires 200 are disposed on the carrier 100; the driving source 300 is electrically connected with the conductive wires 200; an electric pulse capable of driving pets away from the carrier 100 is formed on the carrier 100 after the conductive wires 200 are powered by the driving source 300; the conductive wires 200 are made by a composite conductive material, and the conductive wires 200 may make a non-fracture deformation with the carrier 100. The structure of the carrier 100 and the shape of a current circuit formed by the conductive wires 200 are flexible, in the embodiment, the carrier 100 is an impermeable water rug, and the conductive wires 200 are stitched on the carrier 100 in a coiling form along the plane where the end face of the carrier 100 is located until fully paving the end face of the carrier 100.

Specifically, since the conductive wires 200 disposed in the carrier 100 are made of a composite conductive material, the conductive wires 200 have high ductility and deformation characteristics while realizing an electrostatic pulse circuit after conduction, compared with a pet training rug in the relevant art which has the technical problems of incapability of being folded and washed for cleaning, short service life and the like due to lack of applicable conductive wires 200, and cannot meet the requirements of users gradually, when the pet training structure provided by the application needs to be stored and cleaned or deforms due to impact of external force, the conductive wires 200 may realize winding, unwinding, coiling, rolling and other non-fracture deformation with the carrier 100, the structural deformation cannot interfere with the conductivity of the conductive wires 200, then the convenience and practicability of the pet training structure are effectively improved, the requirements of users are fully met, and it is conductive to improving the market reputation of the product.

Optionally, the conductive wires 200 are made of an organic composite conductive fiber. The organic composite conductive fiber is a technically formed and technically mature structure, in the organic composite conductive fiber formed by the combination of carbon nanotubes and textile fibers, a conductive polymer is a granular material, so that even if the linear nanotube severely deforms, the granular conductive polymer still may be connected to form a collaborative conductive network, so that the prepared combination of the conductive wires 200 and carrier 100 has good conductivity, the details may refer to content of the patent with the application No. of CN201910058615.2 and entitled "Stretchable Flexible Conductive Fiber with Reversible Resistance and Preparation Method thereof". In addition, the organic composite conductive fiber has washing resistance, so that a user may wash the training structure directly by flushing when finishing it, which is convenient and efficient.

Figure 3:
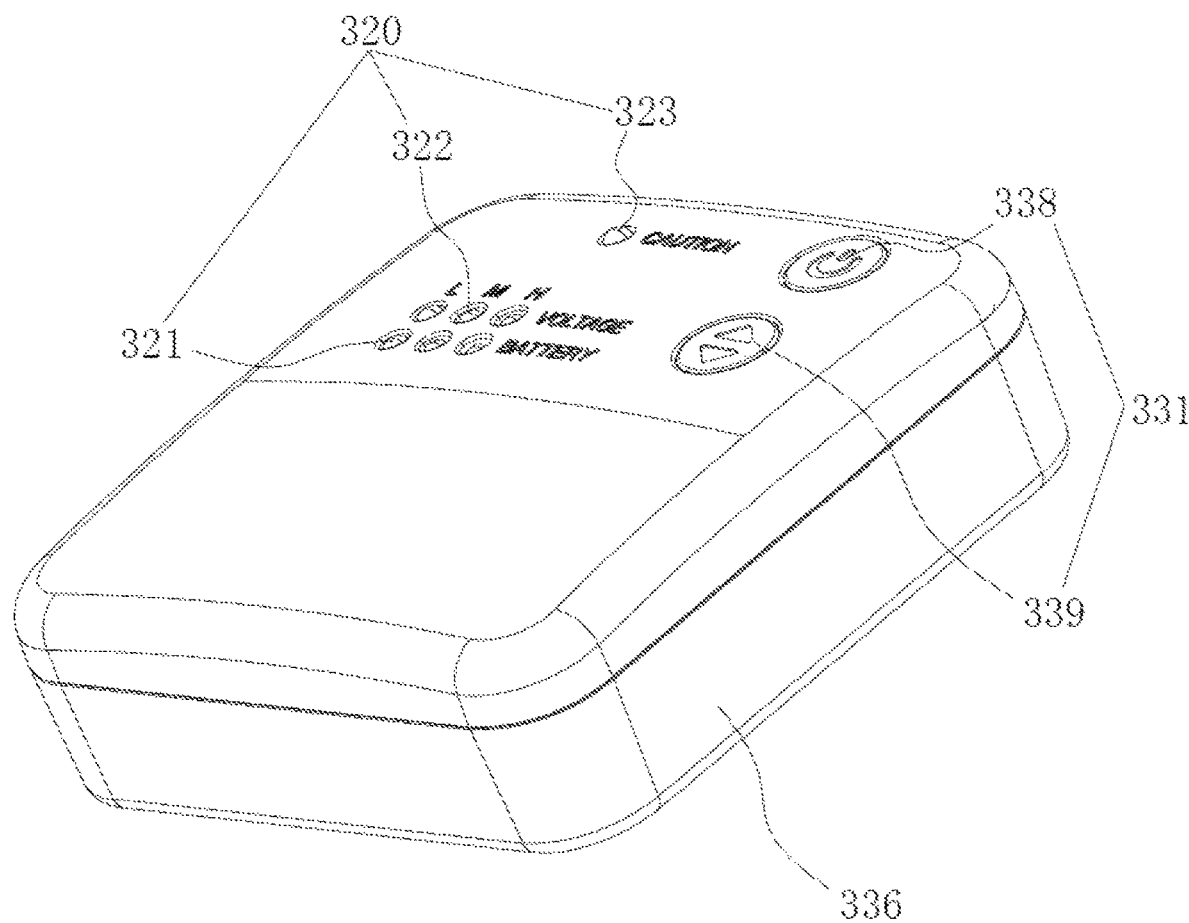
FIG. 3 is a schematic structure diagram of a driving source provided by an embodiment of the application.
Figure 4:
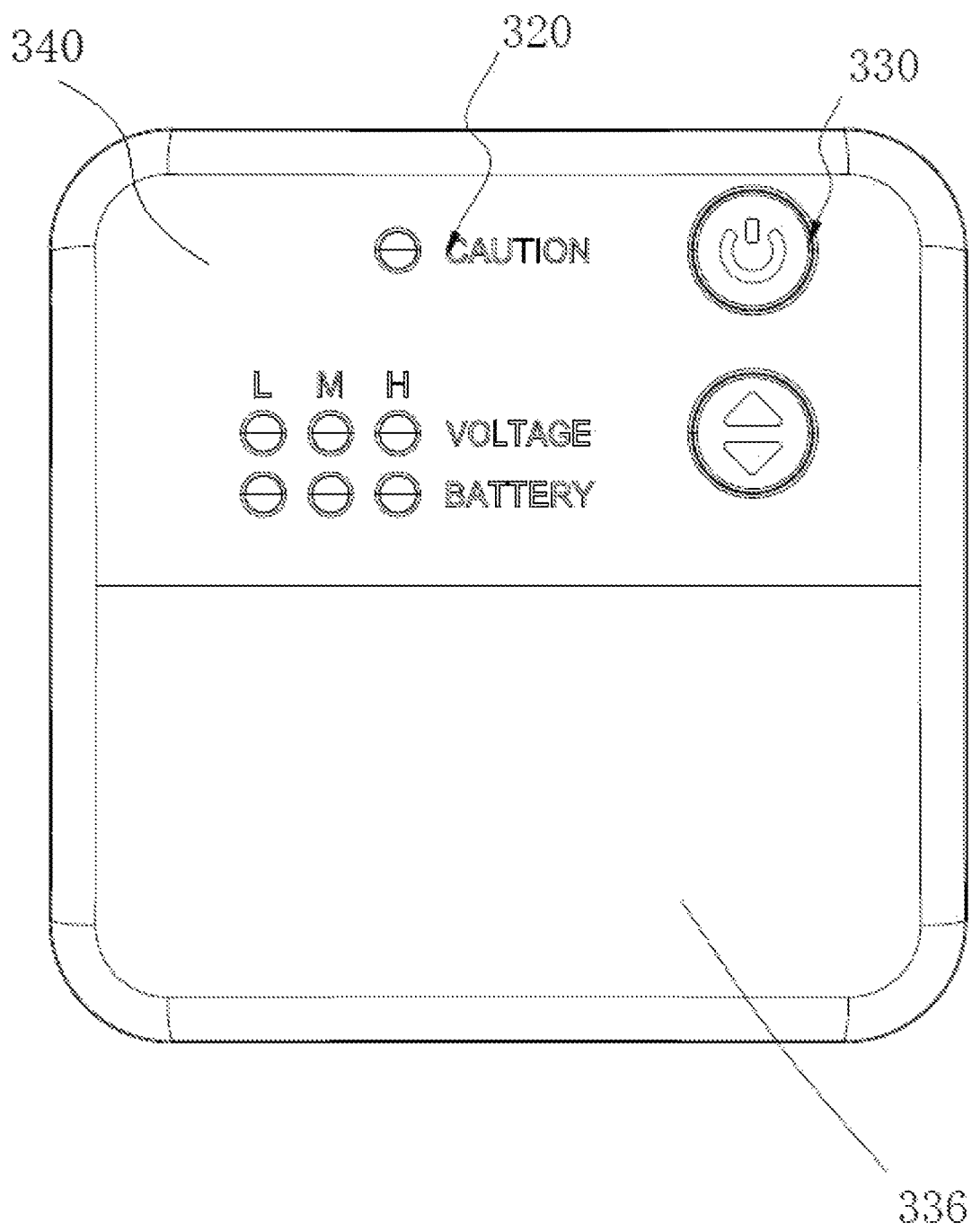
FIG. 4 is a schematic structure diagram of a front view of a driving source provided by an embodiment of the application.
Figure 5:
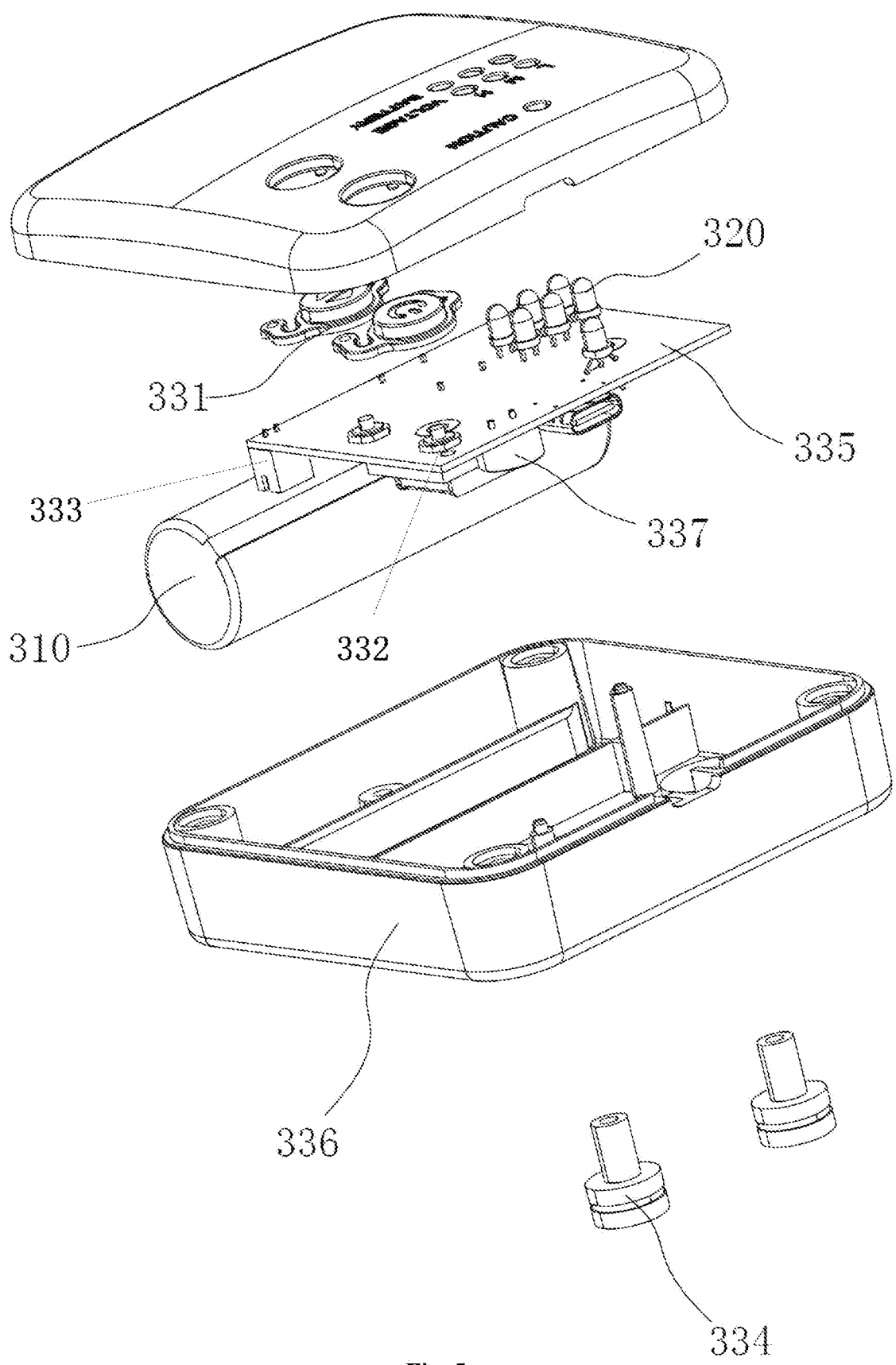
FIG. 5 is schematic structure diagram of an explosive view of a driving source provided by an embodiment of the application.

As shown in FIGS. 3-5, furthermore, the driving source 300 includes a power module 310, a display module 320 and a control module 330, and the power module 310 is configured to provide electric energy; the control module 330 includes an interactive unit 331 and an electronic control unit 332, the interactive unit 331 is connected with the electronic control unit 332 by signals, the electronic control unit 332 is electrically connected with the conductive wires 200, the display module 320 is connected with the electronic control unit 332, after obtaining a signal instruction from the interactive unit 331, the electronic control unit 332 transmits electric energy of the power module 310 to the conductive wires 200 according to the preset signal instruction; and the display module 320 displays the working condition of the pet training structure in real time, so that the user may carry out adjustment according to the working condition at any time.

In other embodiments of the application, the driving source 300 includes a power module 310 and a control module 330, and the power module 310 is configured to provide electric energy; the control module 330 includes an interactive unit 331 and an electronic control unit 332, the interactive unit 331 is connected with the electronic control unit 332 by signals, the interactive unit 331 is connected with a mobile terminal signal of a user through signals, the electronic control unit 332 is electrically connected with the conductive wires 200, after obtaining a signal instruction from the interactive unit 331, the electronic control unit 332 transmits electric energy of the power module 310 to the conductive wires 200 according to the preset signal instruction; and the user sends a signal instruction to the interactive unit 331 through the mobile terminal to start, adjust or close the pet training structure through the electronic control unit 332. The corresponding functions of the interactive unit 331 and electronic control unit 332 are integrated to a mobile terminal of a user, such as mobile phone or a tablet computer through an existing wireless technology, such as Bluetooth or Wi-Fi, so that the user may directly query, control and adjust the working condition of the pet training structure on the mobile terminal, which is convenient and concise.

As shown in FIGS. 3-5, furthermore, the electronic control unit 332 includes a pulse generator 333 and a conductive column 334, and the pulse generator 333 is connected with the interactive unit 331 by signals; the conductive column 334 is disposed at the signal output end of the pulse generator 333 and in butting conduction with the conductive wires 200, and the conductive column 334 is configured to guide pulse signals to move to the conductive wires 200; the pulse generator 333 is a multi-level electrostatic pulse signal generator and is configured to convert low-voltage alternating current provided by the power supply into a high-voltage electrostatic pulse, and the pulse generator 333 transmits a preset-level electrostatic pulse signal to the conductive column 334 according to the signal of the interactive unit 331. Specifically, the conductive column 334 is made of conductive metal, such as copper or aluminum, furthermore, the pulse generator 333 may generate pulse signals of three different degrees, and the strength of the three pulse signals increases step by step in the voltage range of 3 kv to 4.5 kv to achieve an electrostatic training effect. The adoption of the multi-level pulse adjusting function is beneficial to adapt pets of different body types or different natures, thus further improving the practicability of the pet training structure.

As shown in FIGS. 3-5, furthermore, the electronic control unit 332 further includes a control circuit board 335 and an accommodating part 336, the accommodating part 336 is disposed on the carrier 100, the control circuit board 335 is disposed in the accommodating part 336, the interactive unit 331, the power module 310 and the display module 320 are disposed on the accommodating part 336, the interactive unit 331 is connected with the pulse generator 333 through signals through the control circuit board 335, the control circuit board 335 is electrically connected with the display module 320, the power module 310 supplies power to the display module 320 and the pulse generator 333 through the control circuit board 335, and the user may set the pulse level on the control circuit board 335 in advance through the interactive unit 331.

In the embodiment, the control circuit board 335 is a rigid circuit board, the accommodating part 336 is disposed in a hard box body structure, the display module 320 is disposed on the end face of the accommodating part 336, the display module 320 includes a power display part 321 configured for displaying remaining power of a power supply, a pulse level display part 322 configured for displaying signal strength of current electrostatic pulse and a working condition indicating part 323 configured for feeding back the current working state of the pet training structure; the interactive unit 331 includes a switch button 338 disposed on the accommodating part 336 and an adjusting button 339 configured for adjusting the signal strength of the pulse signal generator.

As shown in FIGS. 3-5, the structures of the power display part 321, the pulse level display part 322 and the working condition indicating part 323 are flexible, the power display part 321 in the embodiment includes three groups of LED lamps, the three groups of LED lamps are combined side by side to form a power bar structure, which is configured to represent the power of the power supply, the pulse level display part 322 also includes three groups of indicating lamps, the three groups of indicating lamps correspond to electrostatic pulse intensities of three different levels, the working condition indicating part 323 is a group of LED lamps, and the control circuit board 335 is further provided with a buzzer 337 configured to improving the sense of operational feedback.

Specifically, a use process of the pet training structure is as follows.

Start-up: after the user places the carrier 100 in an area to be protected, the switch button 338 is pressed for three seconds, and the buzzer 337 sounds to indicate that the pet training structure is turned on.

Gear shift: the user circularly controls the adjusting button 339 until the indicating lamp of the corresponding pulse intensity level flashes, indicating that the adjustment is completed.

Shut-down: after the user presses the switch button 338 for three seconds, the buzzer 337 sounds, and the lamp is off after the working condition indicating part 323 flashes twice, indicating that the shutdown is completed.

Electrostatic triggering: when the pet training structure is in the start-up state, when a pet or a conductor touches the conductive wires 200, the buzzer 337 sounds at the same time, the working condition indicating part 323 flashes, the pulse generator 333 releases electrostatic pulse once to the conductive wires 200 at an interval of 0.5 s, at the same time, the buzzer 337 sounds at an interval synchronously to warn the pet; when the release number of electrostatic pulse is more than five times, the buzzer 337 continuously emits two sounds to remind the user to deal with it, then the pulse generator 333 stops releasing electrostatic pulse, and the whole pet training structure is in standby state.

Fault warning: when the pet training structure fails, the working condition indicating part 323 alternately emits red light and blue light every 2 s, meanwhile, the buzzer 337 continuously emits two sounds to remind the user, and in such a case, the pulse generator 333 stops working.

In other embodiments of the application, the control circuit board 335 is a flexible circuit board, the accommodating part 336 is disposed in a flexible bag body structure, a flexible display screen 340 is disposed on the end face of the accommodating part 336, the power display part 321, the pulse level display part 322 and the working condition indicating part 323 are all integrated in the flexible display screen 340, the switch button 338 and the adjusting button 339 are flexible touch pads, and the switch button 338 and the adjusting button 339 are both disposed in the accommodating part 336. After adopting the structures of the flexible circuit board and the flexible touch pads, the control part of the pet training structure in the embodiment is similar to the control principle of a dancing rug in the relevant art, which is a technically formed and technically mature structure, for details, refer to the content that "The edges of the flexible top layer, the first flexible circuit board, the flexible insulating layer, the second flexible circuit board and the flexible bottom layer may be fixed and stitched together by wrapping; and when a dancer steps on a corresponding conductive area, the first flexible circuit board and the second flexible circuit board are connected" described in the specification of the application with the application No. of CN201520061055.3, and entitled "Dancing Rug Capable of Being Folded into Storage Basket", and no elaboration will be made in the embodiment; the adoption of the flexible structure is beneficial for improving the smoothness when the carrier 100 winds and preventing the hard box from interfering the winding process.

As shown in FIG. 5, furthermore, the structure of the power module 310 is flexible, in the embodiment, the power module 310 is a storage battery disposed on the carrier 100, which is charged through a TYPE-C conversion structure, the structure enables the pet training structure not to be affected by the power supply environment, and the flexibility is improved, the power module 310 may also be a dry battery; in other embodiments, the power module 310 is an electrical energy conversion circuit connected to an external power supply apparatus, for example, a household transformer, etc., the power module 310 is directly connected to a household socket to supply power to the control circuit board 335, and the structure enables the pet training structure to always be in working condition regardless of the working time.

The above is only preferred embodiments of the application and not intended to limit the application, and any modifications, equivalent replacements, improvements and the like made within the spirit and principles of the application shall fall within the scope of protection of the application.

What is claimed is:

1. An intelligent electric pulse expelling and isolating pet training structure, comprising:
   a carrier;
   conductive wires, which are disposed on the carrier, and the conductive wires are stitched on the carrier in a coiling form along the plane where the end face of the carrier is located;

a driving source, which is electrically connected with the conductive wires;

the conductive wires form an electric pulse capable of driving pets away from the carrier on the carrier after powered by the driving source; the conductive wires are made by a composite conductive material, and the conductive wires may make a non-fracture deformation with the carrier, and the non-fracture deformation comprises winding, unwinding, coiling, rolling.

2. The intelligent electric pulse expelling and isolating pet training structure according to claim 1, wherein the conductive wires are made of an organic composite conductive fiber.

3. The intelligent electric pulse expelling and isolating pet training structure according to claim 1, wherein the driving source comprises:

a power module, which is configured to provide electric energy;

a control module, which comprises an interactive unit and an electronic control unit, the interactive unit is connected with the electronic control unit by signals, the electronic control unit is electrically connected with the conductive wires, after obtaining a signal instruction from the interactive unit, the electronic control unit transmits electric energy of the power module to the conductive wires according to the preset signal instruction;

a display module, which is connected with the electronic control unit by signals and is configured to display the working condition of the pet training structure in real time.

4. The intelligent electric pulse expelling and isolating pet training structure according to claim 3, wherein the electronic control unit comprises:

a pulse generator which is connected with the interactive unit by signals;

a conductive column, which is disposed at the signal output end of the pulse generator and in butting conduction with the conductive wires, and the conductive column is configured to guide pulse signals to move to the conductive wires;

wherein the pulse generator is a multi-level electrostatic pulse signal generator, and the pulse generator transmits a preset-level electrostatic pulse signal to the conductive column according to the signal of the interactive unit.

5. The intelligent electric pulse expelling and isolating pet training structure according to claim 4, wherein the electronic control unit further comprises a control circuit board and an accommodating part, the accommodating part is disposed on the carrier, the control circuit board is disposed in the accommodating part, the interactive unit, the power module and the display module are disposed on the accommodating part, the interactive unit is connected with the pulse generator through signals through the control circuit board, the control circuit board is electrically connected with the display module, and the power module supplies power to the display module and the pulse generator through the control circuit board.

6. The intelligent electric pulse expelling and isolating pet training structure according to claim 5, wherein the control circuit board is a rigid circuit board, the accommodating part is disposed in a hard box body structure, the display module is disposed on the end face of the accommodating part, the display module comprises a power display part configured for displaying remaining power of a power supply, a pulse level display part configured for displaying signal strength of current electrostatic pulse and a working condition indicating part configured for feeding back the current working state of the pet training structure; the interactive unit comprises a switch button disposed on the accommodating part and an adjusting button configured for adjusting the signal strength of the pulse signal generator.

7. The intelligent electric pulse expelling and isolating pet training structure according to claim 6, wherein the control circuit board is a flexible circuit board, the accommodating part is disposed in a flexible bag body structure, a flexible display screen is disposed on the end face of the accommodating part, the power display part, the pulse level display part and the working condition indicating part are all integrated in the flexible display screen, the switch button and the adjusting button are flexible touch pads, and the switch button and the adjusting button are both disposed in the accommodating part.

8. The intelligent electric pulse expelling and isolating pet training structure according to claim 1, wherein the driving source comprises:

a power module, which is configured to provide electric energy;

a control module, which comprises an interactive unit and an electronic control unit, the interactive unit is connected with the electronic control unit by signals, the interactive unit is connected with a mobile terminal signal of a user through signals, the electronic control unit is electrically connected with the conductive wires, after obtaining a signal instruction from the interactive unit, the electronic control unit transmits electric energy of the power module to the conductive wires according to the preset signal instruction;

the user sends a signal instruction to the interactive unit through the mobile terminal to start, adjust or close the pet training structure through the electronic control unit.

9. The intelligent electric pulse expelling and isolating pet training structure according to claim 4, wherein the pulse generator is configured to convert low-voltage alternating current provided by the power supply into a high-voltage electrostatic pulse, and the voltage range of the electrostatic pulse generated by the pulse generator is 3 kv to 4.5 kv.

10. The intelligent electric pulse expelling and isolating pet training structure according to claim 3, wherein the power module is a storage battery or dry battery disposed on the carrier; or the power module is an electrical energy conversion circuit connected to an external power supply apparatus.

* * * * *